US006803006B1

(12) United States Patent
Naamanka

(10) Patent No.: US 6,803,006 B1
(45) Date of Patent: Oct. 12, 2004

(54) METHOD FOR CREATING A PATTERNED CONCRETE SURFACE

(76) Inventor: Janne Samuli Naamanka, Allan Heikelinpolku 2, FIN-02770 Espoo (FI)

( * ) Notice: Subject to any disclaimer, the term of this patent is extended or adjusted under 35 U.S.C. 154(b) by 0 days.

(21) Appl. No.: 09/913,663

(22) PCT Filed: Feb. 17, 2000

(86) PCT No.: PCT/FI00/00122

§ 371 (c)(1), (2), (4) Date: Aug. 17, 2001

(87) PCT Pub. No.: WO00/48808

PCT Pub. Date: Aug. 24, 2000

(30) Foreign Application Priority Data

Feb. 17, 1999 (FI) ................................................ 990326

(51) Int. Cl.[7] ......................... B29B 15/00; B29B 11/14; B29C 33/56

(52) U.S. Cl. ....................... 264/233; 264/119; 264/122; 264/232; 264/238

(58) Field of Search ................................ 264/232, 233, 264/238, 109, 119, 122

(56) References Cited

U.S. PATENT DOCUMENTS

| | | | |
|---|---|---|---|
| 4,050,943 | A | 9/1977 | Ratanjit |
| 4,055,322 | A | 10/1977 | Cassidy |
| 5,236,975 | A | 8/1993 | Sekine |

FOREIGN PATENT DOCUMENTS

| | | | |
|---|---|---|---|
| DE | 2020339 | A | 11/1971 |
| GB | 312 216 | A | 2/1929 |
| GB | 2 246 315 | A | 1/1992 |

*Primary Examiner*—Stephen J. Lechert, Jr.
(74) *Attorney, Agent, or Firm*—Skinner and Associates

(57) ABSTRACT

A method for creating a patterned concrete surface with the aid of a concrete surface retarding agent. According to the invention, printing technique or an output technique is used to transfer the surface retarding agent forming the desired pattern to the surface coming into direct contact with the concrete to be cast. The printing or output technique can also be used to transfer a release agent or other substance affecting the surface of the concrete to the surface coming into contact with the concrete to be cast, in the same or in a separate transfer stage.

7 Claims, 1 Drawing Sheet

METHOD FOR CREATING A PATTERNED CONCRETE SURFACE

The present invention relates to a method for creating a patterned concrete surface. The method provides innumerable possibilities for shaping the surface structure of concrete in formwork and casting techniques. The method of the invention can be applied both when casting prefabricated units and in in-situ casting.

Previous use has been made of the surface retarding of concrete in concrete formwork and casting techniques, to create an exposed-aggregate concrete surface. Concrete surface retarding agents are existing substances, which retard the hardening of the concrete. They are used to create an exposed-aggregate concrete surface.

When casting prefabricated concrete units among other things, paper on which a surface retarding agent has been spread evenly is used on the bottom of the formwork, to create compact exposed-aggregate concrete units.

A surface retarding agent is also apparently used in certain applications, in such a way that the surface retarding agent is spread mechanically by hand through some kind of stencil onto the bottom of the formwork, thus creating some individual image.

Methods also exist, by means of which patterned exposed-aggregate concrete can be manufactured within predetermined limits, by using the surface retarding agent technique. Two such methods, which have something in common with the present invention, are disclosed in detail in the following. However, the publications referred to are clearly technically and economically inferior to the present invention.

The idea of one method is disclosed in U.S. Pat. No. 4,055,322. In this method, the surface retarding agent is spread on a water permeable membrane. The membrane is placed in the formwork, in such a way that the surface retarding agent is directly against the formwork surface, and the concrete is cast on top of the membrane. In order to function, the surface retarding agent must travel through the membrane to the surface of the concrete by means of diffusion, aided by water that has bled from the concrete.

The weakness of this method is that the need for water permeability limits the materials that can be used, on which the surface retarding agent is spread. In addition, the requirements of the fresh concrete also include a sufficient bleeding of water, which is difficult to control. This is particularly the case in present concrete technology, in which precisely the concrete grades that ensure a long-term durability feature a very small degree of water bleeding. On the other hand, a permeable membrane also weakens the final result, as the movement of the retarding agent inside the membrane also in the direction of the formwork is not taken into account in the patent and probably cannot be prevented. Thus, there is no precise boundary between the exposed and unexposed surfaces. Overall, it appears that the control of the behaviour of the surface retarding agent in the method according to the patent referred to is decisively poorer than in the method according to the patent now being applied for.

In practice, the formwork material immediately against the concrete on all smooth-cast concrete surfaces, made by the method according to U.S. Pat. No. 4,055,322, has been the water permeable membrane referred to above. The membrane may have an undesirable, and at least uncontrollable, effect on the quality of the smooth-cast surface.

The idea of the other method is disclosed in patent EP-0052237. In this method, a normal surface retarding agent membrane is used, with a surface treatment used to cover the part of the membrane on which an exposed-aggregate surface is not desired.

This method is uneconomical, in that a surface retarding agent membrane is required for the entire area to be patterned. In fact, the smooth-cast surface has not only the membrane, but also two layers of chemicals, i.e. the surface retarding agent and a varnish. In addition, the method referred to differs decisively form the present invention, in as much as only one surface retarding agent can be used at a time.

The present invention utilizes a surface retarding agent in an attempt to create a new concept, in which the surface retarding agent is applied either with a printing technique or an output technique.

The method now disclosed also provides, unlike its predecessors, an excellent opportunity of influencing the properties of the smooth-cast surface now created. As is generally known, the release agent spread on the surface of the formwork has its own effect on the quality of the smooth-cast surface created. Several different release agents have been developed to suit different formwork materials and grades of concrete. Release agents can be roughly divided into the following groups, for example:

- pure mineral oils
- chemically modified vegetable oils
- mixtures of vegetable and mineral oils
- emulsified mineral oils
- emulsified vegetable oils.

In the method now disclosed, a suitable release agent can be spread on parts of the membrane, on which the surface retarding agent is not spread. This creates the desired quality of smooth-cast surface.

Another advantages of this embodiment is that, in prefabricated units, in which there will be no patterning at all, it is sufficient to spread the same release agent as that used on the membrane onto the surface of the smooth formwork. The methods previously referred to have not had this advantage, instead, in both methods, if it is desired that the surface of an entirely smooth-cast unit is identical with the smooth-cast surface of a partly exposed-aggregate unit, membranes must also be spread on these units. Here too the concrete manufacturer cannot influence the quality of the smooth-cast surface.

The method according to the invention is intended to achieve a solution with the following properties:

1. the method can be used to create a new kind of surface treatment for concrete in concrete casting technology, which allows the joints between units and the various graphic relief surfaces to be taken into account as part of the design
2. the method provides innumerable possibilities for the designer to shape the surface texture of the concrete with various graphic patterns
3. the method is as flexible as possible, and can be applied to different kinds of concrete casting
4. the point of departure of the method is the most designer-friendly production possible. The designer may send the finished design over a data network to the factory where it will be produced
5. a central objective, concerning the runoff of rainwater and the dirtiness of city air, is to anticipate the dirtying of the facade already during design
6. significant additional costs are avoided, compared to a conventional concrete surface.

The method is based on using concrete surface retarding agents, and, if desired release agents or other desired substances, either by printing techniques or output techniques, in formwork and casting technology. The desired surface pattern is transferred to the casting surface of the formwork, either by printing techniques or output techniques, in which a concrete surface retarding agent is used as the pigment. Modem printing and output techniques make it possible, if desired, the simultaneous or sequential addition of several different surface retarding agents or other substances, which have different effects on the concrete surface. This is because the basic principle of the invention includes not only the formation of a certain pattern, but also the surfacing of areas, to which a surface retarding agent is not added, with a release agent or other substance affecting the concrete surface and, in turn, the quality of the concrete piece created. The surface retarding agents may be of types that affect at different depths.

The casting surface of the formwork may be especially a membrane-like material, for example, coated paper or some other material, to which the pattern is transferred either by a printing or an output technique, in which a surface retarding agent acts as the printing agent or output agent. The technique may be serigraphy, flexography, a digital output technique, or any other printing or output technique. Once the cast concrete has hardened, the formwork is released and the concrete piece washed, to form a pattern on the parts of the exposed-aggregate surface, in which the surface retarding agent was in the formwork.

The method has several advantages over previously known methods of patterning concrete surfaces. Known methods of creating patterns in prefabricated concrete units have included various profiles attached to the bottom of the formwork, surface retarded spread with a brush through some stencil on the bottom of the formwork, sand-blasted patterns on the surface of the concrete unit, or the mechanical grooving of the concrete units. These previously known methods are largely manual processes and thus time-consuming and prevent less restricted patterns being created on the concrete surface. Compared to the state of the art of the publications referred to above, the method of the present invention is more diverse, and economically and ecologically more rational.

The new method according to the invention permits more highly automated production and innumerable possibilities for varying the patterns. It can be used to create a three-dimensional effect on the surface of a concrete piece being manufactured, as the invention makes it easy to create various of depth effects, as disclosed later with reference to the drawings and examples of embodiments.

BRIEF DESCRIPTION OF THE DRAWINGS

The invention is disclosed in detail with reference to the accompanying drawings, in which:

In FIGS. 1, 2, and 3, the layers are drawn with a considerable thickness for reasons of clarity, without intending to show the actual thickness of the layers. In practice, the layers are very thin. The aggregate particles exposed on the surface of the concrete, which are central to the final result, have intentionally not been shown in FIG. 2.

In the examples shown in the Figures, three surface retarding agents that retard to different wash depths are used, and are spread on the surface by means of a printing or output technique. The reference numbers 1, 2, and 3 mark these layers. The retarding agent marked by the number 1 retards the hardening of the concrete to the greatest depth, as shown in the profile in FIG. 2. The agent marked with the number 2 has a moderate effect while that with reference number 3 has the least retarding effect.

Figure 1:
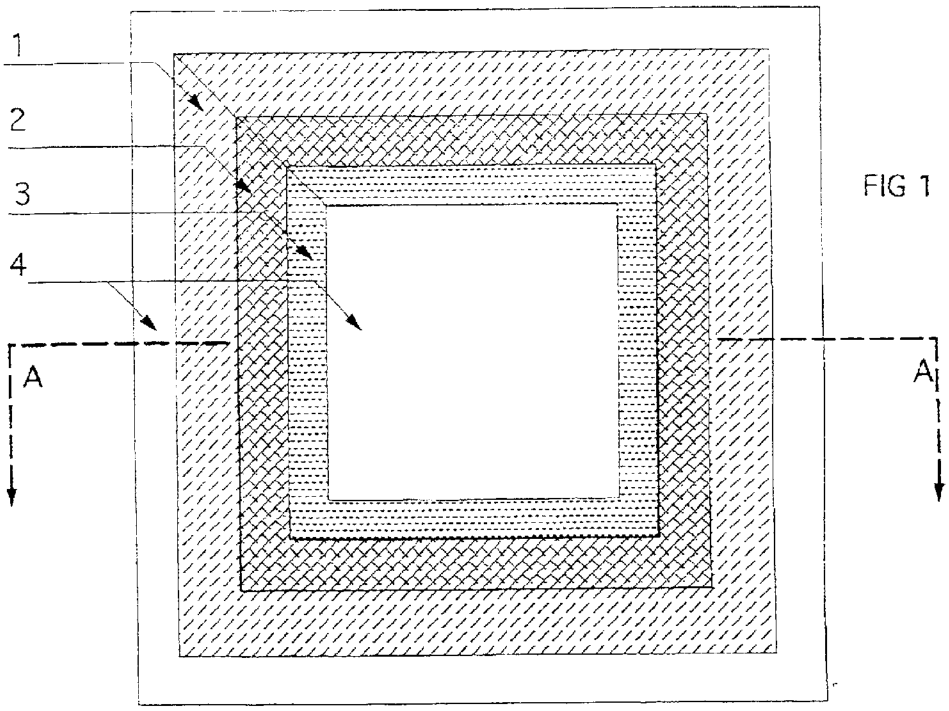
FIG. 1 shows one solution created according to the invention seen from directly above.

As FIG. 1 shows, the patterns from the surface retarding agents are clear and in sharp outline. Thus, they also create a direct and sharply drawn image. In the Figures, reference number 4 marks the release agent, which is added to the surface using the same technique as the surface retarding agent. Generally, the same work stage or sequential work stages can be used to add the various materials. In the same way, when spreading different substances, an output technique can be used if desired with one substance and a printing technique with another. A technique may be selected because, for example, one substance is more easily spread with one technique and the other with another.

Figure 2:
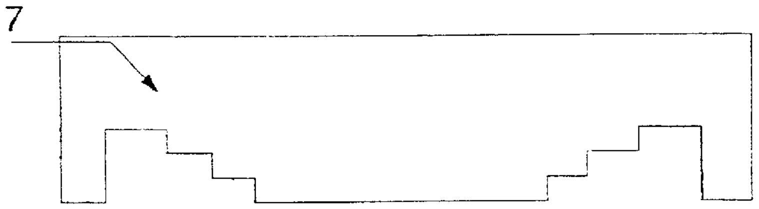
FIG. 2 shows a cross section of the shape of a concrete piece obtained by using the method according to the method.
Figure 3:
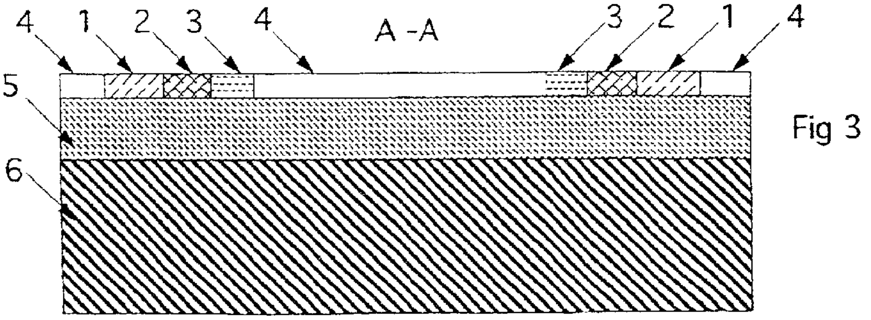
FIG. 3 shows a cross section A-A in FIG. 1.

The essentially water impermeable membrane, to which substances 1, 2, 3, and 4 are transferred by a printing or output technique, is marked by number 5. Number 6 shows the formwork platen, on which the patterned surface retarding agent membrane is placed. In FIG. 2, reference number 7 refers to the concrete.

In the following, the method is disclosed with the aid of examples of embodiments:

EMBODIMENT EXAMPLE 1

Serigraphy on a Membrane

The desired surface pattern is transferred to the membrane using serigraphy, in which a concrete surface retarding agent is used as the printing ink. This creates a patterned surface retarding agent membrane, with the concrete surface retarding agent forming the desired patterns on the membrane. Serigraphy is an existing semiautomatic technique. In serigraphy, the desired number of surface retarding agents, release agents, or other substances can be printed. At the concrete factory, the patterned surface retarding agent membrane is spread on the bottom of the formwork and the concrete material is poured into the formwork. Once the concrete has hardened, the concrete unit is released from the formwork and its surface is washed. The pattern arises in these parts of the surface of the concrete, in which there has been surface retarding agent in the membrane.

Selecting the correct type of membrane prevents crumpling of the surface retarding agent membrane during the process and if desired, by perforating the base of the unit-casting formwork and connecting the holes thus formed to a vacuum reservoir. The vacuum holds the surface retarding agent membrane tightly onto the bottom of the formwork. In in-situ casting, the patterned surface retarding agent membrane can be used according to the invention in such a way that an adhesive secures the membrane to the casting surface of the formwork.

EMBODIMENT EXAMPLE 2

Flexography on a Membrane

The desired surface pattern is printed on the membrane with a flexograph printing press, using concrete surface retarding agent as the printing ink. A flexograph printing press is a so-called roller printing press, in which the prepared printing plates are attached around the roller. A flexograph printing press can print, depending on the machine, a 3–5-meter impression and a repeating pattern up to three meters long. A flexograph printing press can print in four colours in one and the same work stage. The flexograph technique is generally regarded as more economical than serigraphy in larger print runs. In concrete casting, a surface retarding agent membrane printed by this technique is used in the same way as in embodiment example 1.

EMBODIMENT EXAMPLE 3

Digital Output Technique

The desired surface pattern is programmed on a digital printer, which can print an impression up to 5 meters wide. The length of the output impression is not restricted, but can be as long as the file, so that, for example, a varying pattern 5 kilometers long can be output. Such a digital output printer can print on any material at all, because the printing nozzles a well clear of the printing material. Such a printer is apparently used at least in the automobile industry, to meet orders for individually painted cars.

Concrete surface retarding agents and release agents are used as printing inks when manufacturing a patterned surface retarding agent membrane in a digital printer. These substances are formed to the same viscosity as the colours normally used in the machine. The layer thickness of the substances to be printed can be adjusted digitally, without restriction. Such a digital printer prints the desired pattern digitally on the desired material. The printing material may be, for example, a membrane impermeable to water, formwork plywood, or the bottom of the concrete unit formwork, which is generally stainless steel.

A surface retarding agent membrane output by this technique is used to cast a prefabricated concrete unit in the same way as in embodiment example 1. Formwork plywood, which has been printed with concrete surface retarding agent patterns using this technique, can be used in in-situ casting. The bottom of formwork, which has been printed with concrete surface retarding agent patterns using this technique, is used in prefabricated concrete unit casting technology.

What is claimed is:

1. A method for creating a patterned concrete surface, comprising the steps of providing a membrane, applying a surface retarding agent and a release agent to the membrane in a desired pattern by means of a printing technique or an output technique, pouring concrete material onto the membrane, permitting the concrete to harden, releasing the concrete, and processing the concrete to expose the desired pattern, whereby the retarding agent and release agent are transferred directly to the concrete to be cast.

2. A method according to claim 1, wherein the surface retarding agent and release agent are applied to the membrane by serigraphy, flexography, offset printing, or a digital output technique.

3. A method according to claim 1, wherein the membrane is made from a material selected from the group of materials consisting of cellulose, plastic, or metal, and wherein the membrane is placed on the bottom of formwork, with the surface retarding agent and release agent pattern facing the concrete material to be cast.

4. A method according to claim 1, characterized in that the desired pattern to be created with the concrete surface retarding agent is formed at the bottom of the formwork.

5. A method according to claim 1, characterized in that, after hardening, processing of the cast concrete piece is accomplished by washing off the concrete, the hardening of which has been retarded to create the patterned concrete surface.

6. A method according to claim 1, characterized in that plural surface retarding agents are applied, each acting at different depths with respect to the cast concrete to form the patterned concrete surface.

7. A method of creating a patterned concrete surface, comprising the steps of:

(a) providing a water impermeable membrane having first and second sides, (b) applying, by a printing process selected from the group of processes consisting of serigraphy, flexography and digital output, to the first side of the membrane, in a predetermined pattern:
   (i) a surface retarding agent, and
   (ii) a release agent, the release agent not being placed where the surface retarding agent is place, (c) placing the membrane in a form, with the first side of the membrane exposed, (d) pouring concrete material onto the first side of the membrane, (e) permitting the concrete to cure to predetermined level, (f) releasing the cured concrete, and (g) processing the cured concrete by washing, to expose the desired patterned concrete surface, whereby the surface retarding agent and release agent forming the predetermined pattern come into contact direct contact with and are transferred directly to the concrete material to aid in forming the patterned concrete surface.

* * * * *